United States Patent
Roy

(10) Patent No.: US 6,785,802 B1
(45) Date of Patent: Aug. 31, 2004

(54) METHOD AND APPARATUS FOR PRIORITY TRACKING IN AN OUT-OF-ORDER INSTRUCTION SHELF OF A HIGH PERFORMANCE SUPERSCALAR MICROPROCESSOR

(75) Inventor: Protip Roy, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 585 days.

(21) Appl. No.: 09/585,076

(22) Filed: Jun. 1, 2000

(51) Int. Cl.[7] .............................. G06F 15/00; G06F 9/30; G06F 9/40
(52) U.S. Cl. ........................................ 712/216; 712/217
(58) Field of Search ................................. 712/216, 217

(56) References Cited

U.S. PATENT DOCUMENTS

| | | | | |
|---|---|---|---|---|
| 3,995,258 A | * | 11/1976 | Barlow | 714/49 |
| 5,684,971 A | | 11/1997 | Martell et al. | 395/393 |
| 5,745,726 A | | 4/1998 | Shebanow et al. | 395/392 |
| 5,859,991 A | | 1/1999 | Narayan | 395/380 |
| 5,872,948 A | | 2/1999 | Mallick et al. | 395/390 |
| 5,887,161 A | | 3/1999 | Cheong et al. | 395/591 |
| 5,896,542 A | | 4/1999 | Iadonato et al. | 395/800.23 |
| 5,898,854 A | | 4/1999 | Abramson et al. | 395/394 |
| 6,016,540 A | * | 1/2000 | Zaidi et al. | 712/214 |
| 6,032,251 A | | 2/2000 | Tran et al. | 712/216 |
| 6,038,654 A | | 3/2000 | Nguyen et al. | 712/23 |
| 6,178,497 B1 | * | 1/2001 | Frederick et al. | 712/214 |
| 6,247,114 B1 | * | 6/2001 | Trull | 712/216 |

FOREIGN PATENT DOCUMENTS

| | | | |
|---|---|---|---|
| EP | 0 730 224 | 9/1996 | G06F/9/38 |

OTHER PUBLICATIONS

Rosenberg, Jerry M. "Dictionary of Computers, Information Processing, and Telecommunications". Second Edition. New York: John Wiley & Sons, Inc. ©1987. p. 27.*

* cited by examiner

*Primary Examiner*—Eddie Chan
*Assistant Examiner*—Aimee J. Li
(74) *Attorney, Agent, or Firm*—Lisa K. Jorgenson; Christopher F. Regan

(57) ABSTRACT

A microprocessor and associated method includes a plurality of resources for executing instructions, and an out-of-order instruction shelf for priority/age tracking of the instructions. The instruction shelf has an instruction pool with a plurality of slots therein for storing respective instructions, and an instruction age tracker for storing therein a matrix of rows and columns of logic states associated with relative ages of instructions. The logic states in a given column and row of the matrix are associated with a respective slot of the instruction pool. Also, the microprocessor includes an instructions scheduler for performing at least one logic function on each column of the matrix to determine an oldest instruction, for dispatching instructions to the plurality of resources based thereon, and for updating the matrix based upon dispatched instructions.

38 Claims, 3 Drawing Sheets

METHOD AND APPARATUS FOR PRIORITY TRACKING IN AN OUT-OF-ORDER INSTRUCTION SHELF OF A HIGH PERFORMANCE SUPERSCALAR MICROPROCESSOR

FIELD OF THE INVENTION

The present invention relates to microprocessors, and, more particularly, to processing instructions in a superscalar microprocessor.

BACKGROUND OF THE INVENTION

In a superscalar microprocessor, there are multiple execution resources, which can operate simultaneously, and thus produce multiple results per clock cycle. There may be different classes of resources which can perform a task and satisfy an instruction. An instruction stream is decoded, the necessary dependency information is recorded, and the instructions are stored in a structure known as an instruction shelf. An instruction scheduler determines which instructions currently in the instruction shelf, are "ready" for execution and what class of resource is required by each. An instruction is determined to be ready when all the other instructions it depends on have been executed or are being executed. Whenever an instruction is ready and a required class of resource is available, the instruction is picked for execution.

If instructions are scheduled in strict program order, i.e. considered for scheduling only when all its predecessors have been executed, it is called an in-order execution. However, there could be long execution latency associated with instructions preforming memory access, complex arithmetic operation, etc. Hence in an in-order superscalar processor, a lengthy instruction prevents all subsequent instructions from being scheduled even though some of them are ready and there are resources available. This results in poor utilization of resources. An out-of-order processor allows instructions to be scheduled out of strict program order. If an instruction is ready and a resource is available, then such an instruction is scheduled ahead of its predecessors, which may be waiting for an appropriate resource, for example.

In an out-of order instruction shelf, instructions are scheduled or dispatched irrespective of the arrival order of instruction. The order of arrival of instruction to the shelf is always in program order. In order to schedule an instruction to a particular resource, the scheduler needs to choose one instruction from a set of possibly many ready instructions requiring that class of resource. Thus the scheduling approach may be based on a priority previously assigned to or associated with each instruction. Also in some implementations the scheduling approach may be to randomly choose an instruction from among the ready instructions. In the former case, one way of prioritizing the instructions could be prioritizing the age of the instruction, i.e. if two instruction are ready, the one which arrived earlier to the instruction shelf is chosen over the one which arrived later.

In an in-order processor, age priority could be inherently built in if the instruction shelf structure is a First in First out (FIFO) memory. The implementation of a FIFO is a group of registers, each capable of storing an instruction. The instructions fill the FIFO from the bottom to the top. Instructions are dispatched only from the bottom most slots and subsequently, the empty slots created in the bottom are filled by shifting the contents of the registers above them. The fact that older instructions are below younger instructions in the shelf, together with the approach that an instruction is dispatched only from the bottom of the shelf, enforces age priority among the instructions in the shelf.

In an out-of-order instruction shelf, implicit priority cannot be achieved through a pure FIFO. That is because an instruction could be dispatched from any location or slot of an out-of-order shelf. Subsequently a "hole" is created which may be filled by a newly arriving instruction. By filling a hole with a newly arriving instruction, the physical bottom-to-top priority order in the shelf would be eliminated. To prevent the order from being eliminated, the holes can be "collapsed", which means that the instructions from the slots immediately above the hole can be shifted down to fill it (FIGS. 1 and 2). The new instructions, in that case, enter the shelf from the top and thus the order is maintained. The collapsing method is the most widely used out-of-order instruction shelf approach. The collapsing method maintains fairness in scheduling, but has some severe implementation bottlenecks which impede it from operating at a very high clock frequency.

An example case is used here to demonstrate the difficulty. Consider a shelf of depth N=32 and number of resources or Dispatch Width W=4. Every cycle each slot of the shelf needs to determine how many holes are created beneath it (could be 0 to 4) and should shift down by that many slots. That amounts to individually ADDing all the valid-bits (inverted) of the slots below the entry in question. For the top most entry it will be a 31 wide 1-bit ADDer, which includes a 2-bit ADDer followed by 4 stages of 3-bit ADDers knowing that the result cannot be greater than 4. Noting that a 2-bit ADDER comprises 2 gate levels and a 3-bit ADDer comprises 3 gate levels, the sum of gate levels can be computed to be 2+4*3=14 after optimization.

Collapse logic is not only lengthy, another disadvantage is that it adds up to every other pipelined operation being done on the shelf. This is because the entries are susceptible to down-shifting every cycle. So information regarding an entry computed in a cycle cannot be registered in the slot currently occupied by the entry, rather it needs to be registered in the slot the entry is set to move to. For instance when an entry is found to be eligible by the scheduler, the scheduler needs to note the shift amount and mark "scheduled" the slot, where the entry will be moving to. In the subsequent cycle the slot marked "scheduled" is despatched. Schedule and shift, both lengthy operations, are serialized, and thus severely limit the cycle speed.

An example of a conventional superscalar processor is described in U.S. Pat. No. 5,896,542 to Iadonato et al. which includes a tag monitor system for assigning and storing tags for multiple instructions. The tag monitor system includes a tag FIFO for arranging respective tags in the same program order as the instructions.

SUMMARY OF THE INVENTION

In view of the foregoing background, it is therefore an object of the invention to increase the instruction dispatch speed in a superscalar microprocessor having an out-of-order instruction shelf.

This and other objects, features and advantages in accordance with the present invention are provided by a microprocessor including a plurality of resources for executing instructions, and an out-of-order instruction shelf. The instruction shelf has an instruction pool with a plurality of slots therein for storing respective instructions, and an instruction age tracker for storing therein a matrix of rows and columns of logic states associated with relative ages of instructions. The logic states in a given column and row of the matrix are associated with a respective slot of the instruction pool. Also, the microprocessor includes an instructions scheduler for performing at least one logic function on each column of the matrix to determine an oldest instruction, for dispatching instructions to the plurality of resources based thereon, and for updating the matrix based upon dispatched instructions.

The instruction age tracker may comprise a plurality of single-bit registers which define the matrix, and each slot of the instruction pool may comprise a register for storing an instruction and instruction dependency information. Also, each column of logic states of the matrix preferably defines a priority tag for a corresponding slot of the instruction pool, while each logic state may comprise at least one of first and second binary states. The first binary state indicates the presence of an older instruction stored in another slot of the instruction pool. Preferably, each row of logic states of the matrix corresponds to one of the slots of the instruction pool, and the instruction scheduler sets a respective one of the rows to the second binary state when an instruction in a corresponding slot of the instruction pool is dispatched.

The out-of-order instruction shelf may further comprise a valid vector indicating whether each of the slots of the instruction pool includes an instruction. Furthermore, the scheduler may dispatch instructions and update the matrix within a clock cycle.

Objects, features and advantages in accordance with the present invention are also provided by a method of tracking instruction priority in an out-of-order instruction shelf of a microprocessor, including storing respective instructions in a plurality of slots of an instruction pool, and storing, in an instruction age tracker, a matrix of rows and columns of logic states associated with relative ages of instructions. Again, the logic states in a given column and row are associated with a respective slot of the instruction pool. Furthermore, the method includes performing a logic function on each column of the matrix to determine the relative ages of the instructions stored in respective slots of the instruction pool.

Instructions are dispatched based upon the relative ages, and the matrix is updated upon dispatching instructions. Preferably, the matrix is updated during a same clock cycle that instructions are dispatched.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
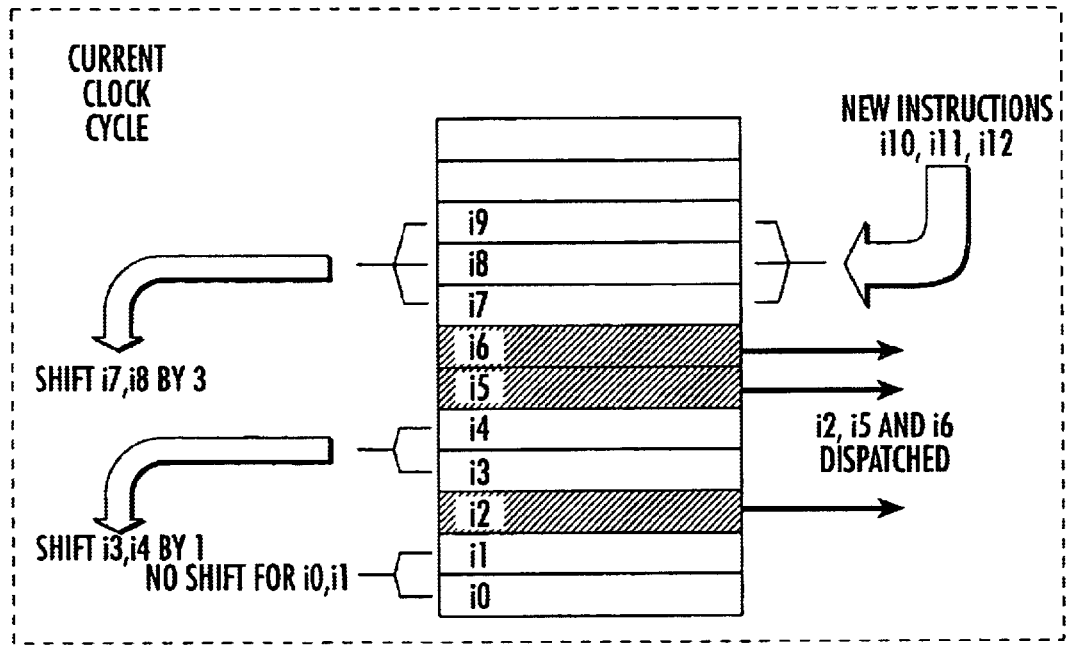
FIGS. 1 and 2 are schematic diagrams of a conventional instruction shelf illustrating dispatching and collapsing of instructions.
Figure 2:
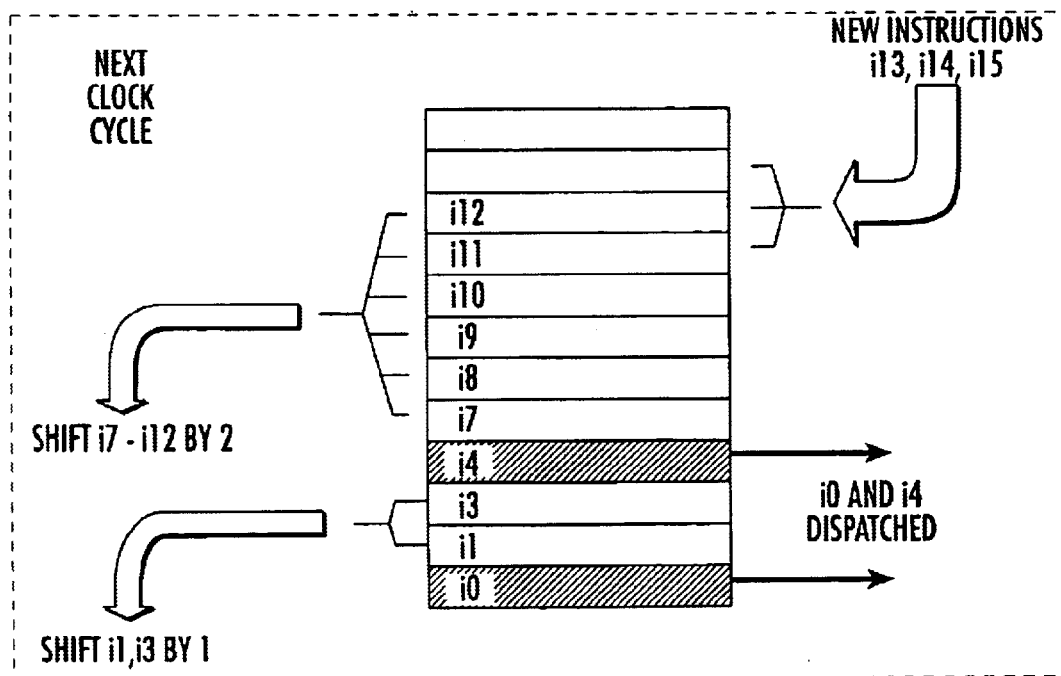
Figure 3:
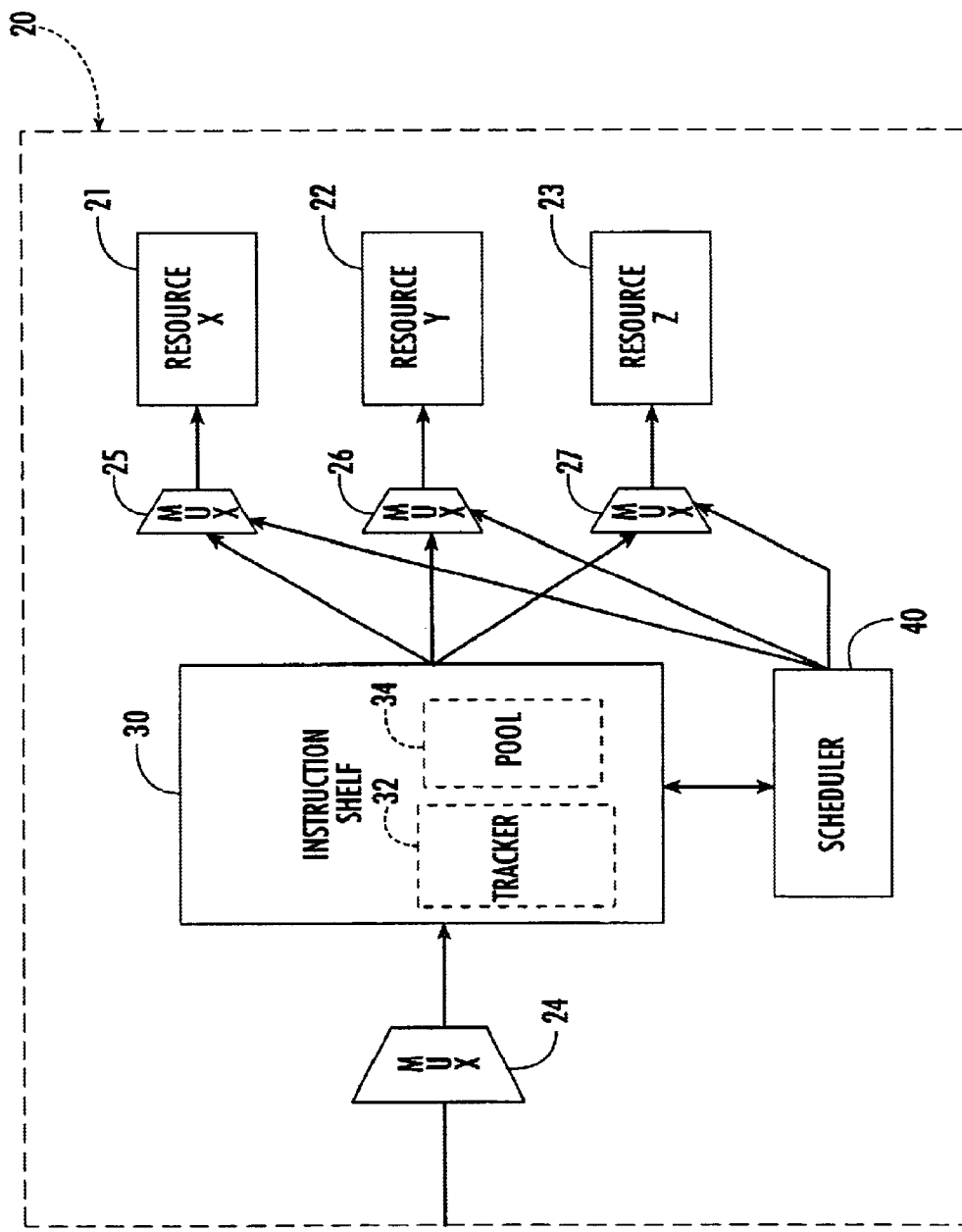
FIG. 3 is a schematic diagram of a superscalar microprocessor including an instruction shelf in accordance with the present invention.
Figure 4:
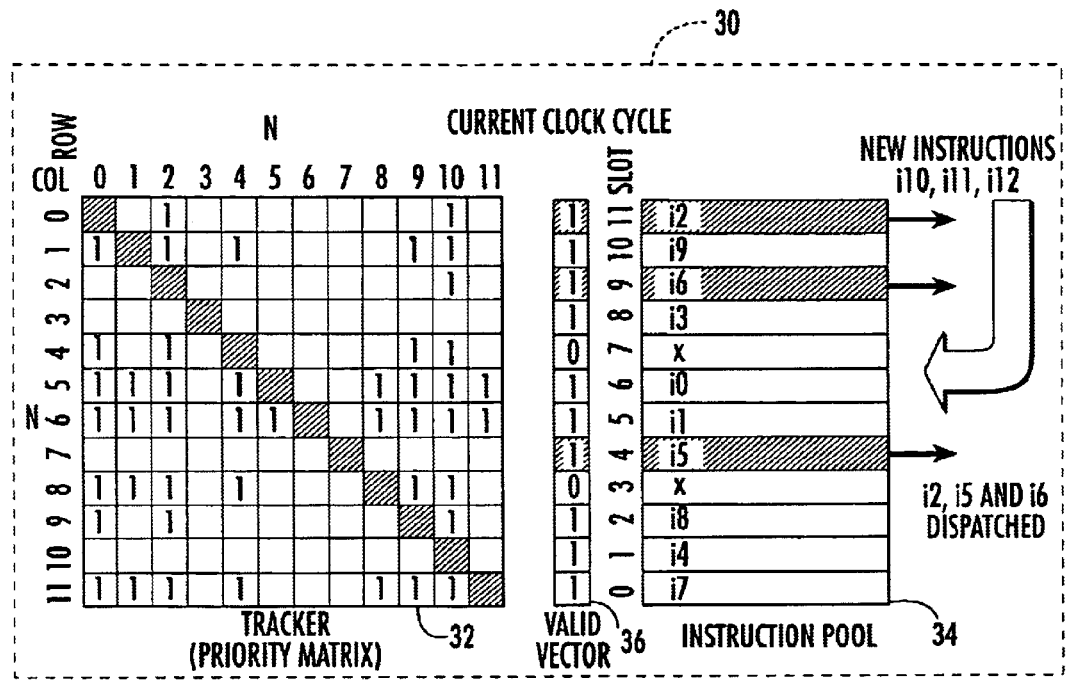
FIGS. 4 and 5 are schematic diagrams of the instruction shelf of FIG. 3 illustrating dispatching and collapsing of instructions in accordance with the present invention.
Figure 5:
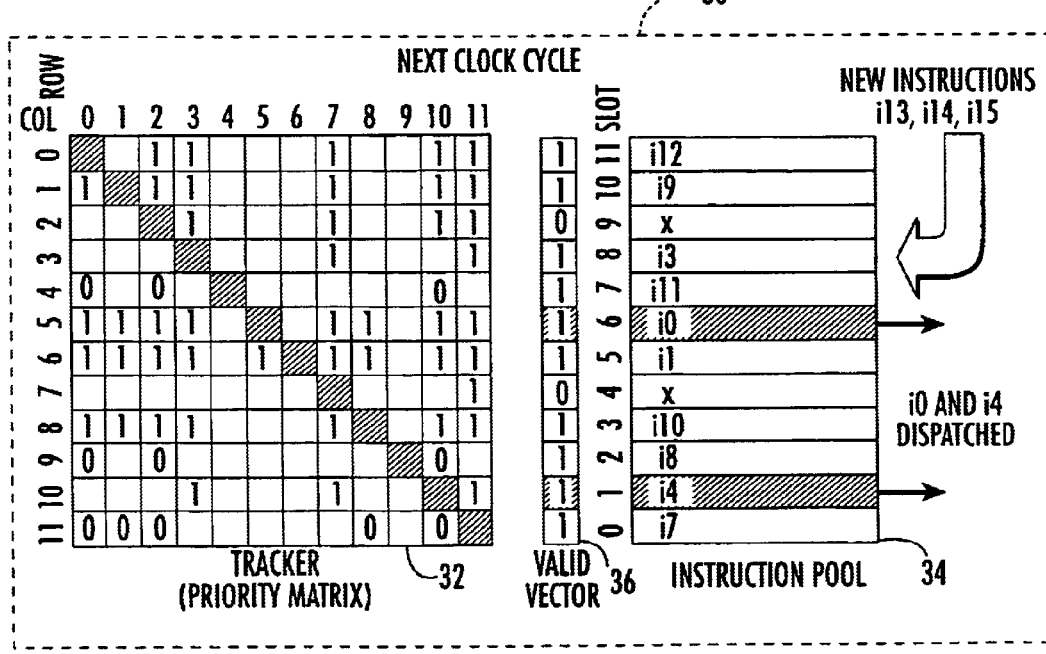

Referring to FIGS. 3–5, a superscalar microprocessor 20 including an instruction shelf 30 in accordance with the present invention will now be described. The superscalar microprocessor 20 includes multiple execution resources 21–23 such as arithmetic logic units and/or memory access units etc., which can operate simultaneously, and thus produce multiple results per clock cycle. An instruction stream is decoded, the necessary dependency information is recorded, and the instructions are stored in the instruction shelf 30. An instruction scheduler 40 determines which instructions currently in the instruction shelf, are ready for execution and what resource 21–23 is required. Whenever an instruction is ready and a required resource 21–23 is available, the instruction is picked for execution.

As discussed above, an out-of-order processor allows instructions to be scheduled out of strict program order. If an instruction is ready and a resource 21–23 is available, then such an instruction is scheduled ahead of its predecessors, which may be waiting for an appropriate resource, for example. In an out-of order instruction shelf 30, instructions are scheduled or dispatched irrespective of the arrival order of the instructions. The order of arrival of the instructions to the shelf 30 is always in program order. In order to schedule an instruction to a particular resource 21–23, the scheduler 40 needs to choose one instruction from a set of possibly many ready instructions requiring that resource. Thus, the scheduling approach will be based on a priority associated with each instruction.

More specifically, the instruction shelf 30 has two parts, one is a group of registers which hold the instructions, referred to as the instruction pool 34. The other part is the instruction tracker 32 or priority matrix which tracks the age of each instruction. After an instruction arrives via an appropriate multiplexor(s) 24, it is can be placed in any empty slot of the pool 34. The instruction stays in the same slot and awaits dispatch. After dispatching, the slot is marked empty again, and a new arrival can be further allocated to it. There is no ordering among the instructions held in the pool 34. The entries in the pool 34 need not be physically contiguous. The newly arriving instructions can be arbitrarily placed in any empty slots of the pool 34. It is the tracker 32 which keeps track of the ages of all entries in the pool 34.

The tracker 32 comprises N×N matrix of single-bit registers, where N is the maximum number of instructions that can be held in the shelf 30. Upon every dispatch and allocation, the tracker is updated to reflect relative ages between instructions. The scheduler 40 performs some simple operations on the tracker to determine the oldest ready instructions every cycle.

The structure of the pool 34 includes N number of registers each capable of holding an instruction and other dependency information. Additionally, there is an N to 1 multiplexor 25–27 per resource, connected to the output of the instruction shelf 30 and the pool 34 registers. The scheduler 40 controls the selector inputs of these multiplexors 25–27. The input of the instruction shelf 30 and the pool 34 registers may be connected to an appropriate multiplexor 24, which can lead any of the newly arriving instructions to an empty slot/register of the pool 34.

The operation of the instruction shelf 30 and the tracker 32 will be described through update and schedule processes while referring more particularly to FIGS. 4 and 5 which schematically illustrate an example of a current clock cycle and next clock cycle, respectively. As set forth above, the registers of the tracker 32 form a priority matrix. The positions that do not include a "1" are "0" even though as illustrated, some may be blank to simplify the explanation of the processes.

In an update process, each column q of the matrix includes an N-bit vector and is the priority tag for the instruction in slot q of the pool 34. Whenever an instruction enters slot number q of the pool 34, the corresponding column q of the matrix may be initiated by a shelf valid vector V (V marks slots with valid entries), indicated by reference numeral 36. On the other hand, whenever an instruction in slot r is dispatched from the pool, the rth bit of all columns of the matrix is reset to 0. It is notable that usually more than one dispatch occurs at the same clock cycle. Hence update can be achieved by simply operating a dispatch-vector D (not shown) on each column. The vectors V and D are -wide, and have the respective slot positions set to binary "1".

It should be clear from the above description that presence of a "1" in any one or more rows/bit position(s) of a particular column q means that there is one or more older instruction(s) in the shelf 30 than the one in slot q. In other words, when all the bits of a column q turn "0" (disregarding the qth position), the instruction in the qth slot is the oldest. If all N bits of each column are OR-ed then only one column will yield the result "0" (the column corresponding to the oldest instruction) and the rest will produce "1". Thus, the OR operation may result in a schedule vector S (not shown) which is N wide and each bit is the logical OR of all the bits of respective columns of the priority matrix. Resulting vector S is one-cold, i.e. all of the bits are "1" except one, which indicates the oldest instruction.

Recalling the fact that scheduling is performed for each resource 21–23 and only among the ready instructions, it is noted that columns may be filtered by a ready vector R and resource class required vector C prior to OR-ing by the scheduler 40. The output of scheduler 40 is the vector S and is used to dispatch the instructions. It is important to note that, unlike the prior art, the output of the scheduler 40 in accordance with the present invention, is a decoded output. Additionally, the terms "row" and "column" have been used herein to simplify the description of the matrix; however, the skilled artisan will appreciate that such terms are relative and may be inter-changeable depending on the orientation of the matrix.

In the example illustrated in FIGS. 4 and 5, the pool has a depth of 12 (N=12), issue width of 3, and a dispatch width of 3. Referring to FIG. 4, instructions i0–i9 have been stored in the 12-slot pool 34 of the instruction shelf 30 (N=12). Slot Nos. 3 and 7 of the pool 34 are currently empty and are indicated (with a "0") as being non-valid instructions by the valid vector 36. Thus, column Nos. 3 and 7 of the matrix are all "0"s and are not under consideration by the scheduler 40. Slot No. 6 of the pool 34 includes the oldest instruction i0. Thus, the corresponding column No. 6 of the matrix is all "0"s. As noted above, the presence of a "1" in any one or more rows/bit position(s) of a particular column q means that there is one or more older instruction(s) in the pool 34 than the one in slot q. For example, column 2 includes eight "1"s which indicates that there are eight older instructions in the pool 34 than the one in slot 2.

The instructions i5, i6, and i2, respectively in slot Nos. 4, 9 and 11 of the pool 34, have been selected by the scheduler 40 as being the oldest ready instructions for the appropriate currently available resources 21–23. Thus, they are dispatched and new instructions i10–i12 are stored in the pool 34 in the same clock cycle.

As can be seen in FIG. 5, the pool 34 has received instructions i10, i11 and i12 in slot Nos. 3, 7 and 11 respectively. Here, slot Nos. 4 and 9 have not been filled and are therefore indicated as being non-valid instructions by the valid vector 36. Also, the valid vector has been updated to indicate (with a "1") that valid instructions are now being stored in slot Nos. 3 and 7. The column Nos. 3, 7 and 11 of the matrix have been updated (with "1"s) to reflect the stored instructions now in the corresponding slots of the pool 34.

The row Nos. 4, 9 and 11 of the matrix have been updated to reflect that the instructions from slot Nos. 4, 9 and 11 were dispatched in the previous cycle. For example, any previous "1" in row No. 4 of any column of the matrix (see FIG. 4) has now been changed to a "0" (see FIG. 5). Based on the updated matrix, instructions i0 and i4, respectively in slot Nos. 6 and 1 of the pool 34, have been selected by the scheduler 40 as being the oldest ready instructions for the appropriate currently available resources 21–23. Thus, they are dispatched and new instructions i13–i15 are stored in the pool 34 during the same clock cycle.

As discussed above, the conventional random selection approach does not solve the priority problem, but completely bypasses it. That results in a certain performance penalty. Randomly picking ready entries could deprive older entries which in turn could build up long dependency chains in the shelf. The resource utilization and instructions-per-cycle (IPC) would be very poor. The conventional collapsing approach maintains fairness in scheduling but has some severe implementation bottlenecks which impede it from operating at very high clock frequency.

In the method and apparatus of the invention, the current schedule operation is unaffected by the current update operation and it is noteworthy that the instructions are stationary in the pool 34, i.e. they are not shifted while being stored. This allows both scheduling and updating during the same cycle resulting in an increase (e.g. 2x) in cycle speed. Thus, the instruction dispatch speed in a superscalar microprocessor with an out-of-order instruction shelf can be increased in accordance with the present invention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A microprocessor comprising:
   a plurality of resources for executing instructions;
   an out-of-order instruction shelf comprising
      an instruction pool having a plurality of slots therein for storing respective instructions, and
      an instruction age tracker for storing therein a matrix of rows and columns of logic states associated with relative ages of instructions, the logic states in a given column and row being associated with a respective slot of the instruction pool; and
   an instructions scheduler for performing at least one logic function on each column of the matrix to determine an oldest instruction, for dispatching instructions to the plurality of resources based thereon, and for updating the matrix based upon dispatched instructions.

2. A superscalar microprocessor according to claim 1 wherein the instruction age tracker comprises a plurality of single-bit registers which define the matrix.

3. A superscalar microprocessor according to claim 1 wherein each slot of the instruction pool comprises a register for storing an instruction and instruction dependency information.

4. A superscalar microprocessor according to claim 1 wherein each column of logic states of the matrix defines a priority tag for a corresponding slot of the instruction pool.

5. A superscalar microprocessor according to claim 4 wherein each logic state comprises at least one of first and second binary states.

6. A superscalar microprocessor according to claim 5 wherein the first binary state indicates the presence of an older instruction stored in another slot of the instruction pool.

7. A superscalar microprocessor according to claim 6 wherein each row of logic states of the matrix corresponds to one of the slots of the instruction pool; and wherein the instruction scheduler sets a respective one of the rows to the second binary state when an instruction in a corresponding slot of the instruction pool is dispatched.

8. A superscalar microprocessor according to claim 1 wherein the out-of-order instruction shelf further comprises a valid vector indicating whether each of the slots of the instruction pool includes an instruction.

9. A superscalar microprocessor according to claim 1 wherein the scheduler dispatches instructions and updates the matrix within a clock cycle.

10. An out-of-order instruction shelf of a microprocessor comprising:
an instruction pool having a plurality of slots therein for storing respective instructions; and
an instruction age tracker for storing therein a matrix of rows and columns of logic states associated with relative ages of instructions, the logic states in a given column and row being associated with a respective slot of the instruction pool;
wherein the relative ages of the instructions stored in respective slots of the instruction pool can be determined by performing a logic function on each column of the matrix.

11. An out-of-order instruction shelf according to claim 10 wherein the instruction age tracker comprises a plurality of single-bit registers which define the matrix.

12. An out-of-order instruction shelf according to claim 10 wherein each slot of the instruction pool comprises a register for storing an instruction and instruction dependency information.

13. An out-of-order instruction shelf according to claim 10 wherein each column of logic states of the matrix defines a priority tag for a corresponding slot of the instruction pool.

14. An out-of-order instruction shelf according to claim 13 wherein each logic state comprises at least one of first and second binary states.

15. An out-of-order instruction shelf according to claim 14 wherein the first binary state indicates the presence of an older instruction stored in another slot of the instruction pool.

16. An out-of-order instruction shelf according to claim 15 wherein each row of logic states of the matrix corresponds to one of the slots of the instruction pool; and wherein a respective one of the rows is set to the second binary state when an instruction in a corresponding slot of the instruction pool is dispatched.

17. An out-of-order instruction shelf according to claim 10 further comprising a valid vector indicating whether each of the slots of the instruction pool includes an instruction.

18. An out-of-order instruction shelf according to claim 10 wherein instructions are dispatched and the matrix is updated within a clock cycle.

19. A method of tracking instruction priority in an out-of-order instruction shelf of a microprocessor, the method comprising:
storing respective instructions in a plurality of slots of an instruction pool;
storing, in an instruction age tracker, a matrix of rows and columns of logic states associated with relative ages of instructions, the logic states in a given column and row being associated with a respective slot of the instruction pool; and
performing a logic function on each column of the matrix to determine the relative ages of the instructions stored in respective slots of the instruction pool.

20. A method according to claim 19 further comprising dispatching instructions based upon the relative ages.

21. A method according to claim 20 further comprising updating the matrix upon dispatching instructions.

22. A method according to claim 20 further comprising updating the matrix during a same clock cycle that instructions are dispatched.

23. A method according to claim 19 wherein the instruction age tracker comprises a plurality of single-bit registers which define the matrix.

24. A method according to claim 19 wherein each slot of the instruction pool comprises a register for storing an instruction and instruction dependency information.

25. A method according to claim 19 wherein each column of the matrix defines a priority tag for a corresponding slot of the instruction pool.

26. A method according to claim 25 wherein each logic state comprises at least one of first and second binary states.

27. A method according to claim 26 further comprising setting one of the logic states of the priority tag to the first binary state to indicate the presence of an older instruction stored in another slot of the instruction pool.

28. A method according to claim 26 wherein each of the rows of the matrix corresponds to one of the slots of the instruction pool; and further comprising setting one of the rows of the matrix to the second binary state when an instruction in a corresponding slot of the instruction pool is dispatched.

29. A method according to claim 19 further comprising indicating, via a valid vector, whether each of the slots of the instruction pool includes an instruction.

30. A method of processing instructions in a superscalar microprocessor comprising:
providing a plurality of resources for executing instructions;
providing an out-of-order instruction shelf including
an instruction pool having slots for storing respective instructions, and
an instruction age tracker comprising a matrix of rows and columns of logic states associated with relative ages of instructions, the logic states in a given column and row being associated with a respective slot of the instruction pool;
storing instructions in respective slots of the instruction pool;
performing a logic function on each column of the matrix to determine the relative ages of the instructions stored in respective slots of the instruction pool; and
dispatching instructions to the plurality of resources based upon the relative ages.

31. A method according to claim 30 further comprising updating the instruction age tracker during a same clock cycle that instructions are dispatched.

32. A method according to claim 30 wherein the instruction age tracker comprises a plurality of single-bit registers which define the matrix.

33. A method according to claim 30 wherein each slot of the instruction pool comprises a register for storing an instruction and instruction dependency information.

34. A method according to claim 33 wherein each column of the matrix defines a priority tag for a corresponding slot of the instruction pool.

35. A method according to claim 34 wherein each logic state comprises at least one of first and second binary states.

36. A method according to claim 35 further comprising setting one of the logic states of the priority tag to the first binary state to indicate the presence of an older instruction stored in another slot of the instruction pool.

37. A method according to claim 35 wherein each of the rows of the matrix corresponds to one of the slots of the instruction pool; and further comprising setting one of the rows of the matrix to the second binary state when an instruction in a corresponding slot of the instruction pool is dispatched.

38. A method according to claim 30 further comprising indicating, via a valid vector, whether each of the slots of the instruction pool includes an instruction.

\* \* \* \* \*